(12) United States Patent
Chen et al.

(10) Patent No.: US 11,562,440 B2
(45) Date of Patent: *Jan. 24, 2023

(54) METHOD FOR PREDICTING BUSINESS INCOME FROM USER TRANSACTION DATA

(71) Applicant: Intuit Inc., Mountain View, CA (US)

(72) Inventors: Meng Chen, Sunnyvale, CA (US); Lei Pei, Sunnyvale, CA (US); Zachary Grove Jennings, Mountain View, CA (US); Ngoc Nhung Thi Ho, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 17/218,855

(22) Filed: Mar. 31, 2021

(65) Prior Publication Data
US 2021/0217102 A1 Jul. 15, 2021

Related U.S. Application Data

(63) Continuation of application No. 15/610,596, filed on May 31, 2017, now Pat. No. 10,997,672.

(51) Int. Cl.
*G06Q 40/00* (2012.01)
*G06F 16/2458* (2019.01)
*G06N 20/00* (2019.01)

(52) U.S. Cl.
CPC ....... *G06Q 40/123* (2013.12); *G06F 16/2465* (2019.01); *G06N 20/00* (2019.01)

(58) Field of Classification Search
CPC .... G06Q 30/0201; G06Q 30/02; G06Q 40/00; G06Q 30/0204; G06Q 30/0255; G06Q 40/02; G06Q 40/025; G06Q 10/067; G06Q 10/04; G06Q 30/0202; G06Q 30/0269; G06Q 10/06375; G06Q 20/4016; G06Q 30/0185; G06Q 30/0207; G06Q 30/0261;

(Continued)

(56) References Cited

U.S. PATENT DOCUMENTS

2003/0033194 A1* 2/2003 Ferguson ............. G06K 9/6269
705/7.29
2003/0033587 A1* 2/2003 Ferguson ............... G06Q 10/04
717/104

(Continued)

*Primary Examiner* — Alexander G Kalinowski
*Assistant Examiner* — Sanjeev Malhotra
(74) *Attorney, Agent, or Firm* — Ferguson Braswell Fraser Kubasta PC

(57) ABSTRACT

A method that predicts business income from user transaction data. A multinomial classifier is trained, using a vector of features from data related to a historical transaction and a label associated with the historical transaction, to generate a probability that the historical transaction belongs to a specific classification with respect to income. Data related to a new transaction is split into a set of unigrams. A new vector of features is generated from the data related to the new transaction. The new vector includes a set of values that correspond and are assigned to the set of unigrams. A classification with respect to income is determined for the new transaction by applying the multinomial classifier to the new vector. The new transaction is labeled with the classification. One or more fields of a form that is maintained by an online service is populated using the classification.

18 Claims, 18 Drawing Sheets

(58) Field of Classification Search
CPC ........... G06Q 30/0601; G06Q 30/0226; G06Q 30/0234; G06Q 30/0239; G06Q 30/0241; G06Q 30/04; G06Q 40/123; H04M 15/44; H04M 15/58; H04M 15/745; H04M 15/80; H04M 15/8011; H04M 15/8044; H04M 15/805; H04M 15/8083; H04M 15/83; H04M 15/84; H04M 15/85; H04M 15/851; H04M 2215/0104; H04M 2215/0108; H04M 2215/018; H04M 2215/0184; H04M 2215/0188; H04M 2215/74; H04M 2215/7407; H04M 2215/745; H04M 2215/7457; H04M 2215/81; H04M 2215/8129; H04M 2215/815; H04M 15/00; Y04S 10/54; G06N 20/00; G06N 5/003; G06N 5/02; G06N 5/04; G06N 7/005
USPC ............ 705/3, 7.29, 7.31, 7.33, 7.37, 14.23, 705/14.42, 14.43, 14.49, 14.53, 14.66, 705/26.1, 26.64, 30, 35, 38, 44, 46, 348; 704/9; 707/E17.022; 706/20; 709/231; 717/104

See application file for complete search history.

(56) References Cited

U.S. PATENT DOCUMENTS

| | | | | |
|---|---|---|---|---|
| 2003/0130899 A1* | 7/2003 | Ferguson | ............... | G06Q 30/06 705/26.1 |
| 2004/0015386 A1* | 1/2004 | Abe | ................... | G06Q 30/0239 705/7.29 |
| 2005/0251468 A1* | 11/2005 | Eder | ................. | G06Q 30/0601 705/35 |
| 2007/0244741 A1* | 10/2007 | Blume | .............. | G06Q 30/0269 705/7.31 |
| 2008/0015871 A1* | 1/2008 | Eder | ...................... | G06Q 40/00 705/348 |
| 2008/0126556 A1* | 5/2008 | Perng | ...................... | H04L 65/70 709/231 |
| 2008/0249844 A1* | 10/2008 | Abe | ................... | G06Q 30/0234 705/7.29 |
| 2008/0319829 A1* | 12/2008 | Hunt | ................. | G06Q 30/0201 705/7.29 |
| 2009/0018996 A1* | 1/2009 | Hunt | ...................... | G06Q 30/02 |
| 2009/0132347 A1* | 5/2009 | Anderson | ............ | G06Q 30/02 705/30 |
| 2009/0192809 A1* | 7/2009 | Chakraborty | ........ | G06Q 10/067 705/348 |
| 2009/0210368 A1* | 8/2009 | Deo | .................... | G06K 9/6267 706/20 |
| 2010/0049538 A1* | 2/2010 | Frazer | ................ | G06Q 30/0244 705/14.43 |
| 2010/0063947 A1* | 3/2010 | Burnside | ............... | G16H 10/60 705/3 |
| 2011/0078071 A1* | 3/2011 | Dorai | ..................... | G06Q 40/02 705/38 |
| 2011/0173116 A1* | 7/2011 | Yan | ......................... | G06Q 40/02 705/348 |
| 2012/0109821 A1* | 5/2012 | Barbour | ................. | G06Q 40/02 705/44 |
| 2013/0073514 A1* | 3/2013 | Cai | ........................ | G06F 16/951 707/E17.022 |
| 2013/0132163 A1* | 5/2013 | Eder | ........................ | G06N 5/02 705/7.37 |
| 2013/0325548 A1* | 12/2013 | Kulkarni | ........... | H04M 15/8011 705/7.29 |
| 2013/0325587 A1* | 12/2013 | Kothari | .............. | G06Q 30/0243 705/14.42 |
| 2013/0325608 A1* | 12/2013 | Kulkarni | ............... | H04M 15/83 705/14.53 |
| 2013/0325667 A1* | 12/2013 | Satyavolu | .......... | G06Q 30/0629 705/26.64 |
| 2013/0325680 A1* | 12/2013 | Satyavolu | ............. | H04M 15/58 705/35 |
| 2013/0325681 A1* | 12/2013 | Somashekar | ....... | H04M 15/851 705/35 |
| 2014/0074762 A1* | 3/2014 | Campbell | .............. | G06Q 40/00 706/46 |
| 2014/0143134 A1* | 5/2014 | Yan | ....................... | G06Q 40/025 705/38 |
| 2014/0172560 A1* | 6/2014 | Satyavolu | ......... | H04M 15/8044 705/14.53 |
| 2014/0279527 A1* | 9/2014 | Duke | ................... | G06Q 20/4016 705/44 |
| 2014/0297268 A1* | 10/2014 | Govrin | ..................... | G06N 5/02 704/9 |
| 2015/0170175 A1* | 6/2015 | Zhang | ................. | H04M 15/851 705/7.33 |
| 2015/0220951 A1* | 8/2015 | Kurapati | ........... | G06Q 30/0204 705/7.33 |
| 2015/0220999 A1* | 8/2015 | Thornton | ............ | H04M 15/805 705/14.66 |
| 2015/0348083 A1* | 12/2015 | Brill | ..................... | G06Q 20/386 705/14.23 |
| 2016/0063502 A1* | 3/2016 | Adjaoute | ............... | G06N 20/00 705/44 |
| 2016/0086222 A1* | 3/2016 | Kurapati | ............... | G06Q 40/08 705/14.53 |
| 2016/0196587 A1* | 7/2016 | Eder | .................. | G06Q 30/0271 705/14.49 |
| 2016/0224996 A1* | 8/2016 | Hunt | ...................... | G06F 16/283 |
| 2018/0032870 A1* | 2/2018 | Liu | ......................... | G06N 3/084 |
| 2018/0268015 A1* | 9/2018 | Sugaberry | .............. | G06N 3/049 |
| 2018/0285773 A1* | 10/2018 | Hsiao | ..................... | G06N 20/00 |

* cited by examiner

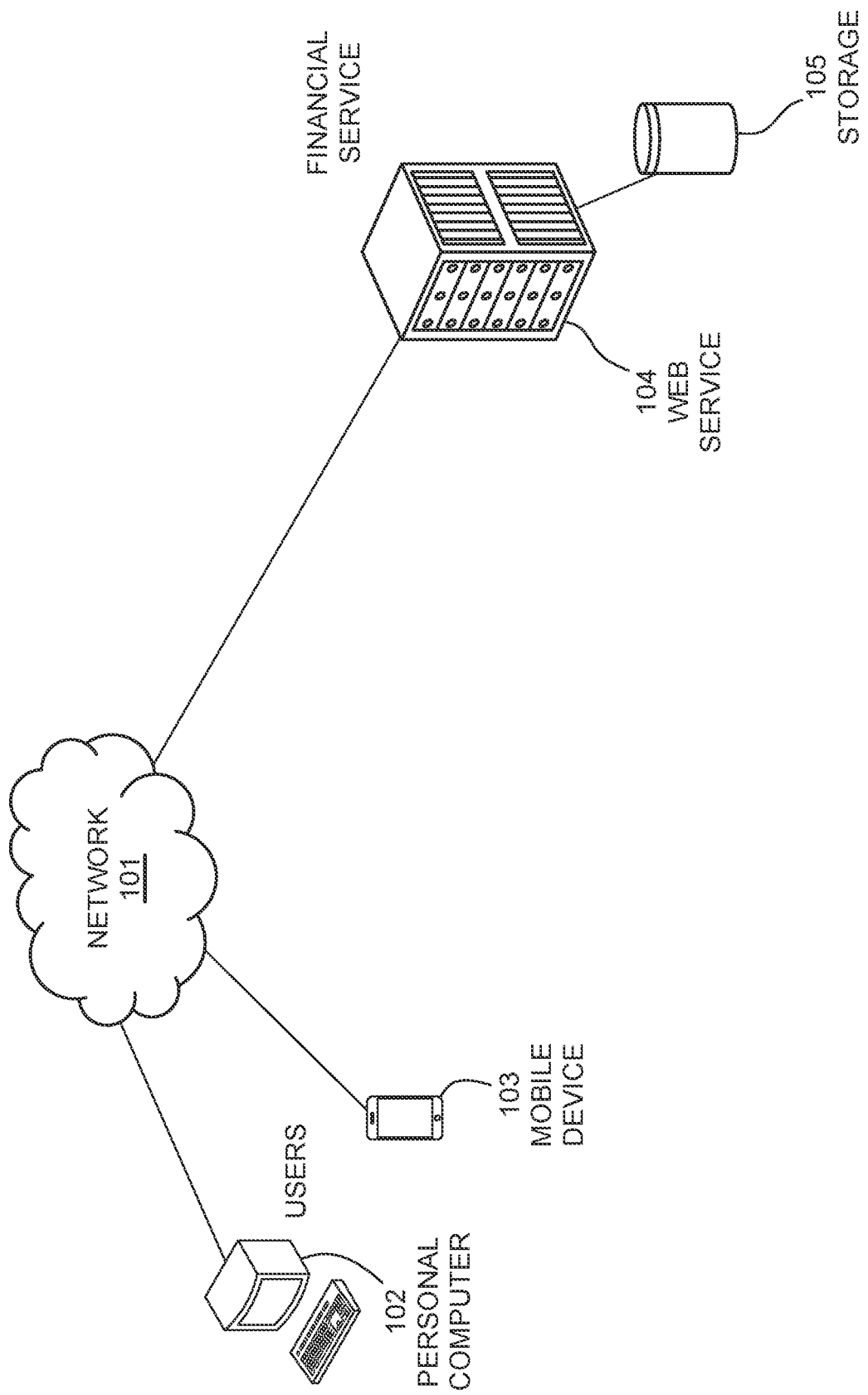

| DATE | TRANSACTION | AMOUNT | TYPE |
|---|---|---|---|
| 5 Jan 17 | Employer | 800.00 | WAGE |
| 9 Jan 17 | Etsy | 30.00 | BUSINESS |
| 15 Jan 17 | Friend | 14.00 | BUSINESS |

FIGURE 3A

| DATE | TRANSACTION | AMOUNT | TYPE |
|---|---|---|---|
| 5 Jan 17 | Employer | 800.00 | WAGE |
| 9 Jan 17 | Etsy | 30.00 | BUSINESS |
| 15 Jan 17 | Friend | 14.00 | WAGE  BUSINESS  PERSONAL |

FIGURE 3B

| DATE | TRANSACTION | AMOUNT | TYPE |
|---|---|---|---|
| 5 Jan 17 | Employer | 800.00 | WAGE |
| 9 Jan 17 | Etsy | 30.00 | BUSINESS |
| 15 Jan 17 | Friend | 14.00 | PERSONAL |

FIGURE 3C

MODEL TRAINING: 1) SPLITS TRANSACTION DATA INTO UNIGRAMS, CALCULATES DAY OF WEEK AND WEEK OF THE YEAR. EACH OF THESE ARE CONSIDERED A FEATURE IN THE MODEL.

MODEL TRAINING: 2) DETERMINE WEIGHTS FOR EACH FEATURE WITH >0 EQUATING TO MORE BUSINESS RELATED AND <0 MORE PERSONAL RELATED. WEIGHTS ARE DETERMINED FROM 40 MILLION TRANSACTIONS

TRANSACTION DESCRIPTION: [Stevie] [Streck] [Designs]

FI ACCOUNT NAME: [Checking]

DAY OF WEEK: [Monday]

WEEK OF YEAR: [24]

FI TYPE = [3]

| FEATURE | WEIGHT |
|---|---|
| Stevie | 0.12365488 |
| Streck | 0.33797066 |
| Designs | 0.99382532 |
| Checking | -0.22158688 |
| Monday | -0.110 |
| 24 | -0.1470241 |
| 3 | -0.414 |

403 — Designs
404 — Checking

FIGURE 4B

MODEL TRAINING: 3) ADD UP WEIGHTS AND CALCULATE CLASS PROBABILITY

| FEATURE | WEIGHT |
|---|---|
| Stevie | 0.12365488 |
| Streck | 0.33797066 |
| Designs | 0.99382532 |
| Checking | -0.22158688 |
| Monday | -0.110 |
| 24 | -0.1470241 |
| 3 | -0.414 |

$$405 \rightarrow p(business, income) = \frac{1}{1+e^{-(w_{stevie}+w_{streck}+w_{designs}+w_{checking}+w_{monday}+w_{24}+w_{3})}}$$

FIGURE 4C

MODEL TRAINING: 3) ADD UP WEIGHTS AND CALCULATE CLASS PROBABILITY

| FEATURE | WEIGHT |
|---|---|
| DC | 0.12365488 |
| Parking | 0.33797066 |
| Meters | 0.99382532 |
| Checking | -0.22158688 |
| Monday | -0.110 |
| 24 | -0.1470241 |
| 3 | -0.414 |

405 — $P(business, income) = \dfrac{1}{1+e^{-.56285}} = 0.637$

FIGURE 4D

MODEL TRAINING: 3) ADD UP WEIGHTS AND CALCULATE CLASS PROBABILITY

| FEATURE | WEIGHT |
|---|---|
| DC | 0.12365488 |
| Parking | 0.33797066 |
| Meters | 0.99382532 |
| Checking | -0.22158688 |
| Monday | -0.110 |
| 24 | -0.1470241 |
| 3 | -0.414 |

$$P(business, income) = \frac{1}{1+e^{-.56285}} = 0.637$$

P(business) < 0.70, THIS TRANSACTION IS A PERSONAL INCOME TRANSACTION — 406

FIGURE 4F

```
5   --------
Unnamed: 0                                    16679185
txn_id                                       267286780
txn_create_date                    2016-04-01 02:51:38.0
txn_date                                    2016-03-31
txn_review                                           1
user_id                                         282647
user_locale                                      en_US
business                                             0
txn_amount                                         500
txn_desc_cleaned
fl_type                                              3
fl_name                                 Emh Payroll Pr
fl_account_name                              Chase Bank
                                           Huff Wedding  ← 501
Name: 5, dtype: object
Relevant Vocab:  ['emh' 'payroll' 'pr']
Corresponding Coefs:  [ 0.         -1.05169647 -1.0594655 ]  ← 502
Relevant FI Account Vocab: ['wedding']
Corresponding FI Account Coefficients [-0.05353243]
Final Probability: 0.114692221149  | Truth: Personal
                                    ↑
                                   503
```

FIGURE 5A

```
1
Unnamed: 0                                    13229848
txn_id                                        65410693
txn_create_date                    2015-12-06 22:06:01.0
txn_date                                    2015-09-10
txn_review                                           2
user_id                                         245887
user_locale                                      en_US
business                                             1
txn_amount                                         222
txn_desc_cleaned                        Deposit Mobile
fi_type                                              3
fi_name                                      USAA Bank
fi_account_name                         The Pet Nanny ─── 504
Name: 1, dtype: object
Relevant Vocab: ['deposit'] ─── 505
Corresponding Coefs: [ 0.47037335]
Relevant FI Account Vocab: ['nanny' 'pet']
Corresponding FI Account Coefficients [ 0.            2.05601239]
Final Probability: 0.9337730004002  | Truth: Business
                                              └── 506
```

FIGURE 5B

FIGURE 6A intuit turbotax Self-Employed

My Account ▾ | 🔍 Search | 👤 Contact

‹ Tax Timeline

Personal Info | Federal Taxes | State Taxes | Review | File

INCOME  2016

1099-MISC - Ebay        $500    [ Edit ]  🗑
Additional Income    $13,500    [ Edit ]  🗑

[ Add income for this work ]

You have not entered any expenses for this work yet.

[ Add expenses for this work ]

How do I add another line of work?

‹ Back                                              [ Done ]

604 — (points to 1099-MISC line)
605 — (points to Add expenses for this work)
603 — (points to window)

FIGURE 6B

METHOD FOR PREDICTING BUSINESS INCOME FROM USER TRANSACTION DATA

CROSS REFERENCE TO RELATED APPLICATIONS

This application is a continuation of, and thereby claims benefit under 35 U.S.C. § 120 to U.S. patent application Ser. No. 15/610,596, filed on May 31, 2017, which is hereby incorporated by reference herein.

BACKGROUND

Users of a financial service such as an online tax service often have trouble classifying (or categorizing) their cash inflows or income, e.g., for purposes of filling out an income tax form. Many users have both wage income from their primary job and non-wage income from side jobs such as driving for Uber or selling crafts on Etsy. And some cash inflows are merely transfers between family and friends that are not considered income according to the tax regulations. Such a financial service typically provides a graphical user interface (GUI) to assist users in classifying their cash flows. However, even with a GUI, individual classification of each cash inflow is expensive both in terms of time and effort. Consequently, software to assist users with such income classification (or categorization) is an area of ongoing research and experimentation by makers of financial services.

SUMMARY

In general, in one or more aspects, the disclosure relates to a method that predicts business income from user transaction data. A multinomial classifier is trained, using a vector of features from data related to a historical transaction and a label associated with the historical transaction, to generate a probability that the historical transaction belongs to a specific classification with respect to income. Data related to a new transaction is split into a set of unigrams. A new vector of features is generated from the data related to the new transaction. The new vector includes a set of values that correspond and are assigned to the set of unigrams. A classification with respect to income is determined for the new transaction by applying the multinomial classifier to the new vector. The new transaction is labeled with the classification. One or more fields of a form that is maintained by an online service is populated using the classification.

In general, in one or more aspects, the disclosure relates to a system includes a processor and a storage storing instructions that are executed by the processor. A multinomial classifier is trained, using a vector of features from data related to a historical transaction and a label associated with the historical transaction, to generate a probability that the historical transaction belongs to a specific classification with respect to income. Data related to a new transaction is split into a set of unigrams. A new vector of features is generated from the data related to the new transaction. The new vector includes a set of values that correspond and are assigned to the set of unigrams. A classification with respect to income is determined for the new transaction by applying the multinomial classifier to the new vector. The new transaction is labeled with the classification. One or more fields of a form that is maintained by an online service is populated using the classification.

In general, in one or more aspects, the disclosure relates to a method that predicts business income from user transaction data. A vector of features is generated from data related to a historical transaction. A probability that the historical transaction belongs to a specific classification with respect to income is generated. A multinomial classifier is trained using the vector, a label associated with the historical transaction, and the probability. Data related to a new transaction is split into a set of unigrams. A new vector of features is generated from the data related to the new transaction. The new vector includes a set of values that correspond and are assigned to the set of unigrams. A classification with respect to income is determined for the new transaction by applying the multinomial classifier to the new vector. The new transaction is labeled with the classification. One or more fields of a form that is maintained by an online service is populated using the classification.

Other aspects of the invention will be apparent from the following description and the appended claims.

BRIEF DESCRIPTION OF DRAWINGS

FIG. 1 depicts a network diagram showing a website hosting a multi-user online financial service, in accordance with one or more embodiments.

FIGS. 3A, 3B, and 3C depict a graphical user interface (GUI) view that allows a user to classify a financial transaction with respect to income, in accordance with one or more embodiments.

FIGS. 4A, 4B, 4C, 4D, 4E, and 4F depict the operations of a process for determining a classification with respect to income for a transaction from a financial account, in accordance with one or more embodiments.

FIGS. 5A and 5B depict the output of a process for determining a classification with respect to income for a transaction from a financial account, in accordance with one or more embodiments.

FIGS. 6A, 6B, and 6C depict GUI views for a multi-user online financial service, in accordance with one or more embodiments.

DETAILED DESCRIPTION

Figure 2A:
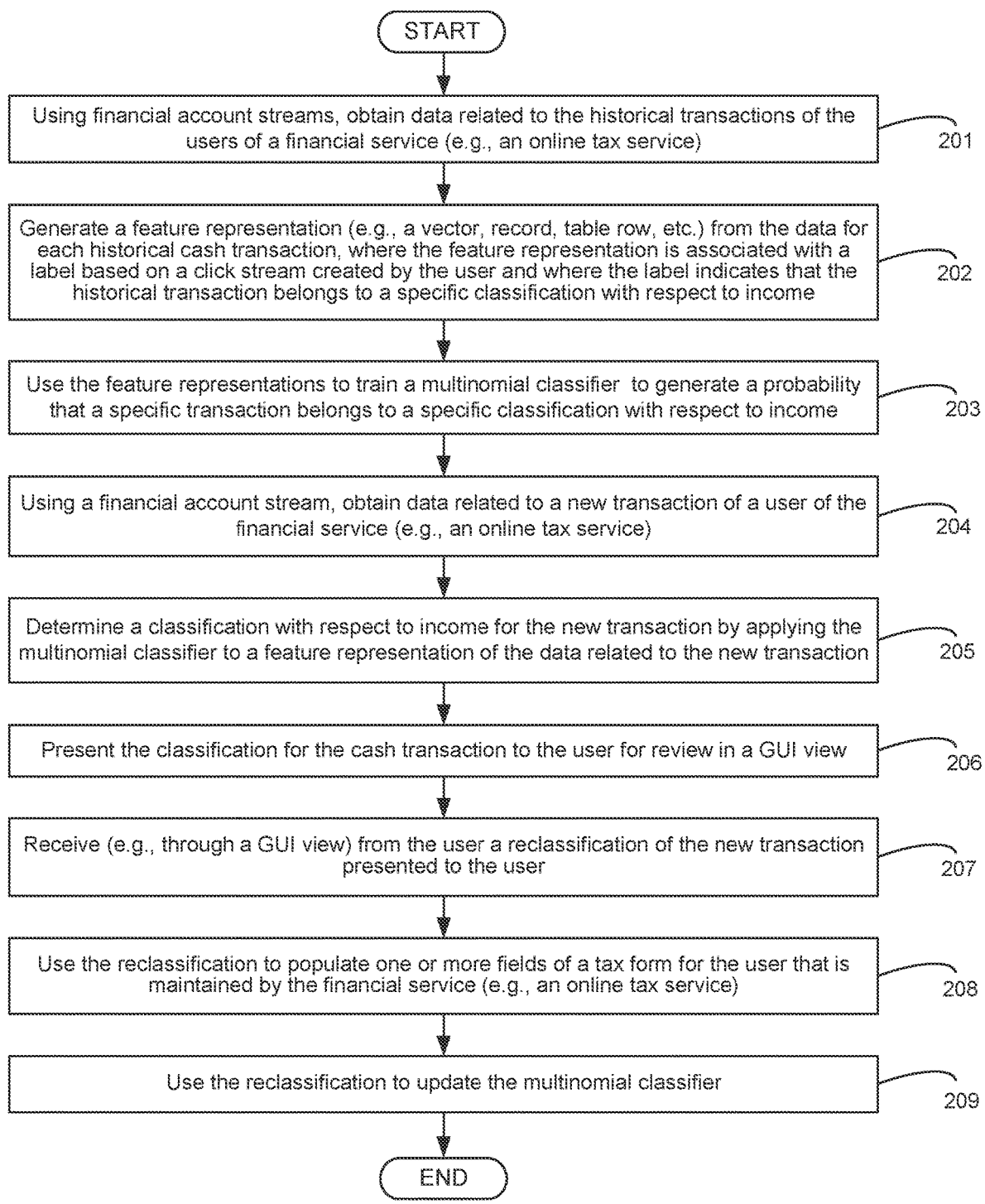
FIG. 2A depicts a flowchart diagram of a process for determining a classification with respect to income for a transaction from a financial account and for receiving a reclassification of a transaction from a financial account, in accordance with one or more embodiments.

Specific embodiments will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or proceed) the second element in an ordering of elements.

In general, the invention assists users with income classification (or categorization), saving them both time and effort when using a financial service, such as a multi-user online tax service. In one or more embodiments, a financial service's software might obtain data related to historical transactions (e.g., cash inflows) of a user of the financial service from a financial stream for an financial account of the user (e.g., made accessible using Open Financial Exchange or OFX). In one or more embodiments, a label might be a user classification with respect to income of a transaction (e.g., cash inflow) of the user, where the classification was made by the user in a graphical user interface (GUI) view displayed by the financial service. In one or more embodiments, the software might use the labels to train a classifier to determine a classification (or category) with respect to income for a new transaction of a user and present the classification for the new transaction to the user in a GUI view for approval.

If the user accepts the classification (e.g., "non-wage income") of the new transaction, the software might use the classification to populate a field of a form, e.g., a tax form. If the user reclassifies the classification of the new transaction using the GUI view (e.g., changes a classification of a transaction from "non-wage income" to "non-income transfer"), the software might then use the reclassification to populate a field in a form and use the reclassification to update the classifier. It will be appreciated that the accepted classifications performed by the classifier might significantly reduce the number of classifications performed by the user, e.g., when filling out a form such as a tax form.

FIG. 1 is a network diagram showing a website hosting a multi-user financial service, in accordance with an example embodiment. As depicted, a personal computer 102 (e.g., a laptop or other mobile computer) and a mobile device 103 (e.g., a smartphone such as an iPhone, Android, Windows Phone, etc., or a tablet computer such as an iPad, Galaxy, etc.) are connected by a network 101 (e.g., a wide area network (WAN) including the Internet, which may be wireless in part or in whole) with a web service 104 hosting a financial service, such as a multi-user online tax service (e.g., QuickBooks Self-Employed). In an example embodiment, the multi-user online tax service may be massively multi-user (e.g., have thousands, hundreds of thousands, or millions of users).

In an example embodiment, web service 104 may be composed of a number of servers (e.g., racked servers) connected by a wired or wireless network (not shown) (e.g., a local area network (LAN) or a WAN) to each other in a cluster (e.g., a load-balancing cluster, a Hadoop cluster, a Beowulf cluster, etc.) or other distributed system which may run website software (e.g., web-server software, database software, etc.) and distributed-computing and/or cloud software such as Map-Reduce, Google File System, Hadoop, Hadoop File System, Hadoop YARN, Hive, Dremel, CloudBase, Memcached, Redis, etc. The servers in web service 104 may be connected to storage 105. Storage 105 may include flash memory, a redundant array of independent disks (RAID), and/or a storage area network (SAN), in one or more embodiments. Additionally or alternatively, the servers for web service 104 and/or storage 105 may be hosted wholly or partially in a public and/or private cloud, e.g., where the cloud resources serve as a platform-as-a-service (PaaS) or an infrastructure-as-a-service (IaaS).

Storage 105 may be used to store accounting and financial data, including accounting and financial data related to the historical and current transactions of the users of the online tax service. Additionally, storage 105 may be used to store data and algorithms related to the classification processes described in this disclosure. In one or more embodiments, personal computer 102 and mobile device 103 may each include a browser as an application program or as part of an operating system. Examples of browsers that may execute on personal computer 102 include Internet Explorer, Mozilla Firefox, Safari, and Google Chrome. Examples of browsers that may execute on mobile device 103 include Safari, Mozilla Firefox, Android Browser, and webOS Browser. It will be appreciated that users of personal computer 102 and/or mobile device 103 may use browsers to access web service 104, e.g., to perform accounting transactions. Additionally or alternatively, users of personal computer 102 and/or mobile device 103 may use other application programs or applications to access web service 104.

FIG. 2A is a flowchart diagram of a process for determining a classification with respect to income for a transaction from a financial account, in accordance with one or more embodiments. In one or more embodiments, the operations shown in this figure may be performed by software running on servers at web service 104 using storage 105 (as depicted and described in relation to FIG. 1). In one or more embodiments, one or more of the operations (e.g., the pre-processing operations) shown in this figure may be performed on clustered computers running distributed-computing software that supports batch processing based on a Map-Reduce architecture (e.g., Hadoop). In one or more embodiments, one or more of the operations shown in FIG. 2A may be performed on clustered computers running distributed-computing software that supports stream processing based on a Map-Reduce architecture (e.g., Hadoop YARN). In one or more embodiments, some of the operations shown in FIG. 2A may be performed by software (e.g., a client application including, for example, a webpage with embedded JavaScript or ActionScript) running on a client device (e.g., personal computer 102 or mobile device 103).

While the various operations in this flowchart and the flowcharts described below in relation to FIG. 2A are presented and described sequentially, one of ordinary skill will appreciate that some or all of the steps may be executed in different orders, may be combined or omitted, and some or all of the steps may be executed in parallel. Furthermore, the steps may be performed actively or passively. For example, some operations may be performed using polling or be interrupt driven in accordance with one or more embodiments. By way of an example, determination steps may not require a processor to process an instruction unless an interrupt is received to signify that condition exists in accordance with one or more embodiments. As another example, determination steps may be performed by performing a test, such as checking a data value to test whether the value is consistent with the tested condition in accordance with one or more embodiments.

As depicted in FIG. 2A, the software (e.g., the software running on servers) uses financial account (e.g., bank account, brokerage account, etc.) streams to obtain data (e.g., account names, transaction descriptions including payor/payee names, amounts, dates, etc.) related to the historical transactions of the users of a financial service (e.g., an online tax service), in operation 201.

In operation 202, a feature representation (e.g., a vector, record, table row, etc.) is generated from the data for each historical cash transaction. In one or more embodiments, each feature representation may be associated with a label based on a click stream (e.g., active or passive interactions with GUI views as described elsewhere) created by the user. The label indicates that the historical transaction belongs to a specific classification with respect to income (e.g., wage income, non-wage income, or a non-income transfer).

In operation 203, the feature representations is used to train a multinomial classifier (e.g., based on logistic regression, naïve Bayes, support vector machines, deep learning, etc.) to generate a probability that a specific transaction belongs to a specific classification with respect to income (e.g., wage income, non-wage income, or a non-income transfer). In one or more embodiments, the training of the multinomial classifier may involve assigning weights to a sparse matrix made up of feature representations that are vectors.

Then in operation 204, a financial account stream is used to obtain data related to a new transaction of a user of the financial service.

In operation 205, a classification with respect to income for the new transaction is determined by applying the multinomial classifier to a feature representation of the data related to the new transaction.

In operation 206, the classification for the cash transaction is presented to the user for review in a GUI view.

In operation 207, the software (e.g., the software running on servers at website 104) receives (e.g., through a GUI view) from the user a reclassification of a new transaction presented to the user (e.g., in operation 206 of FIG. 2A), in operation 207.

In operation 208, the reclassification is used to populate one or more fields of a tax form for the user that is maintained by the financial service (e.g., an online tax service).

And in operation 209, the software uses the reclassification to update the multinomial classifier, e.g., either periodically in batch at a predetermined time (hourly, daily, weekly, monthly, etc.) or in real-time or near real-time.

It will be appreciated that in the process described above, the software generates, for each historical transaction, a vector whose features (e.g., name of a source of income such as Etsy or day of the week such as Tuesday) are drawn from the data related to the historical transaction. Then the software uses the vectors and labels for all of the users of the financial service to train a multinomial classifier (e.g., based on logistic regression or naïve Bayes, support vector machines, deep learning, etc.) to generate a probability that a particular transaction belongs in a specific classification (or category) with respect to income (e.g., wage income, non-wage income, or non-income transfers).

Figure 2B:
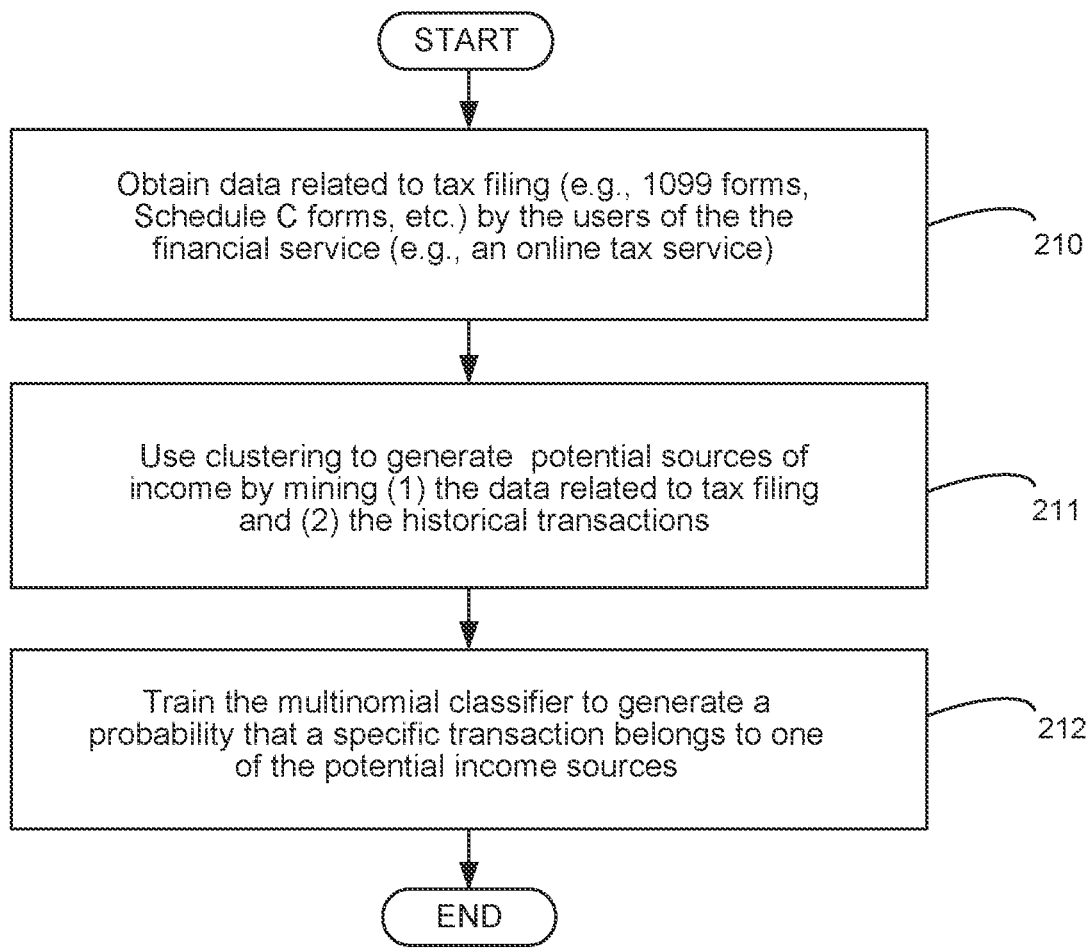
FIG. 2B depicts a flowchart diagram of a process for identifying a source of income for a transaction from a financial account, in accordance with one or more embodiments.

FIG. 2B depicts a flowchart diagram of a process for receiving a reclassification of a transaction from a financial account, in accordance with one or more embodiments. It will be appreciated that the operations shown in FIG. 2B may be used in conjunction with the operations shown in FIG. 2A, in one or more embodiments. Here again, in one or more embodiments, one or more of the operations shown in FIG. 2B may be performed on clustered computers running distributed-computing software that supports batch processing based on a Map-Reduce architecture (e.g., Hadoop). In one or more embodiments, one or more of the operations shown in FIG. 2B may be performed on clustered computers running distributed-computing software that supports stream processing based on a Map-Reduce architecture (e.g., Hadoop YARN). In one or more embodiments, some of the operations shown in FIG. 2B may be performed by software (e.g., a client application including, for example, a webpage with embedded JavaScript or ActionScript) running on a client device (e.g., personal computer 102 or mobile device 103).

As depicted in FIG. 2B, the software (e.g., the software running on servers at website 104) obtains data related to tax filing (e.g., 1099 forms, schedule C forms, etc.) by the users of the a financial service (e.g., an online tax service), in operation 210.

In operation 211, clustering functionality (e.g., k-nearest neighbors, k means, etc.) is used to generate potential sources of income (e.g., Etsy, Uber, Lyft, etc.) by mining (1) the data related to tax filing and (2) the historical transactions.

In operation 212, a multinomial classifier is trained to generate a probability that a specific transaction belongs to one of the potential income sources. In one or more embodiments, the software may apply this multinomial classifier to a new transaction after first applying a multinomial classifier to determine that the new transaction is non-wage income, e.g., in operation 205 of FIG. 2A. In one or more embodiments, the multinomial classifiers described in FIGS. 2A and 2B may be a single multinomial classifier. Or in one or more embodiments the multinomial classifiers described in FIGS. 2A and 2B may be a separate multinomial classifiers.

In one or more embodiments, the clustering functionality may be supplemented with other functionality when identifying potential sources of income. For example, the software may use Fourier transforms to determine the periodicity of payments from potential sources of income and use those periodicities to distinguish between potential sources of incomes.

In one or more embodiments, the multinomial classifiers described in FIGS. 2A and 2B may be wholly or partially off-the-shelf (OTS) and/or open-source software, e.g., from the scikit-learn Python library. Similarly, in one or more embodiments, the clustering functionality described in FIG. 2B may be wholly or partially OTS and/or open-source software.

FIGS. 3A, 3B, and 3C show a graphical user interface (GUI) view that allows a user to reclassify a financial transaction with respect to income, in accordance with one or more embodiments. It will be appreciated that such a view may be used with operations 206 and/or operation 207 in FIG. 2B, in one or more embodiments. As depicted in FIG. 3A, view 301 displays the transactions of a user of the financial service (e.g., a tax service) as the rows in a table whose columns include Date, Transaction, Amount, and Type. The first row 302 shows a transaction which the software's multinomial classifier has determined to be wage income, as shown in the Type column. The second row 303 shows a transaction which the software's multinomial classifier has determined to be non-wage business income, as shown in the Type column. And the third row 304 also shows a transaction which the software's multinomial classifier has determined to be non-wage business income, as shown in the Type column.

FIG. 3B shows the same view 301 after the user has clicked on the type (e.g., BUSINESS) in row 304. The view has changed to allow the user to reclassify the type of the transaction by selecting from WAGE, BUSINESS, or PERSONAL. FIG. 3C shows view 301 again, after the user has reclassified the type for the transaction in row 304 to PERSONAL. As discussed above, this reclassification may become a label resulting from the user's clickstream for a GUI and may be used by the software to train and/or update the software's multinomial classifier, in one or more embodiments.

Figure 4A:
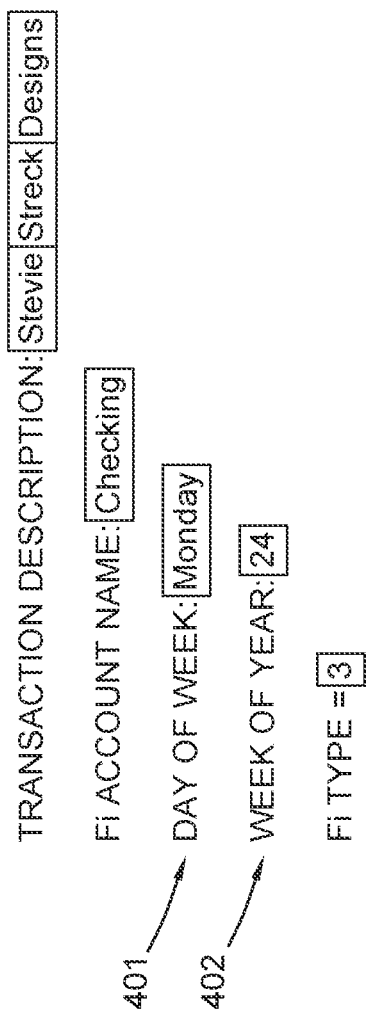

FIGS. 4A, 4B, 4C, 4D, 4E, and 4F show the detailed operations of a process for determining a classification with respect to income for a transaction from a financial account, in accordance with one or more embodiments of the invention. As depicted in FIG. 4A, the software (e.g., the software running on servers at website 104) splits the transaction data into unigrams and calculates a day of a week and a week of year, in operation 1. In one or more embodiments, the software may use bigrams, trigrams, or some other n-gram instead of or in addition to unigrams when performing this operation. Also, in one or more embodiments, the unigrams (or other n-grams) are filtered using a custom stop-word dictionary (e.g., which filters out first names, last names, location names, country names, state names county names, city names, proper nouns, etc.) that has been developed through empirical testing of the multinomial classifier. As noted in FIG. 4A, the unigrams (e.g., as filtered) may then become features in the vectors which may be used to train and/or update the multinomial classifier or which the trained multinomial classifier may take as inputs. Similarly, the calculated day of the week (401) and the calculated week of the year (402) may become features in the vectors which may be used to train and/or update the multinomial classifier or which the trained multinomial classifier may take as inputs.

As depicted in FIG. 4B, weights are assigned to each feature, in operation 2. The example shown in FIG. 4B has been simplified for illustrative purposes and consequently uses only two classifications, business and personal. It will be appreciated that such a classifier is a binary classifier rather than a multinomial classifier. Using these two classifications, features (e.g., feature 403) which are indicative of business income (e.g. wage income and non-wage income) are assigned positive weights, whereas features (e.g., feature 404), which are indicative of a non-income transfer are assigned negative weights. In one or more embodiments that involve a multinomial classifier rather than a binary classifier, ranges may be applied to assign weights. So, for example, in one or more embodiments, a multinomial classifier might assign the word 'predictable' a weight of 0.44 for income, a weight of 0.15 for non-wage income, and a weight of 0.01 for non-income transfer. As noted in FIG. 4B, the weights are determined from forty million transactions which have been labeled either passively (e.g., presented to the user and the user does not reclassify the transaction) or actively (e.g., presented to the user and the user reclassifies the transaction). In an example embodiment, transactions that are actively labeled may be given more weight than transactions that are passively labeled, during training and/or updating of the multinomial classifier.

Figure 4E:
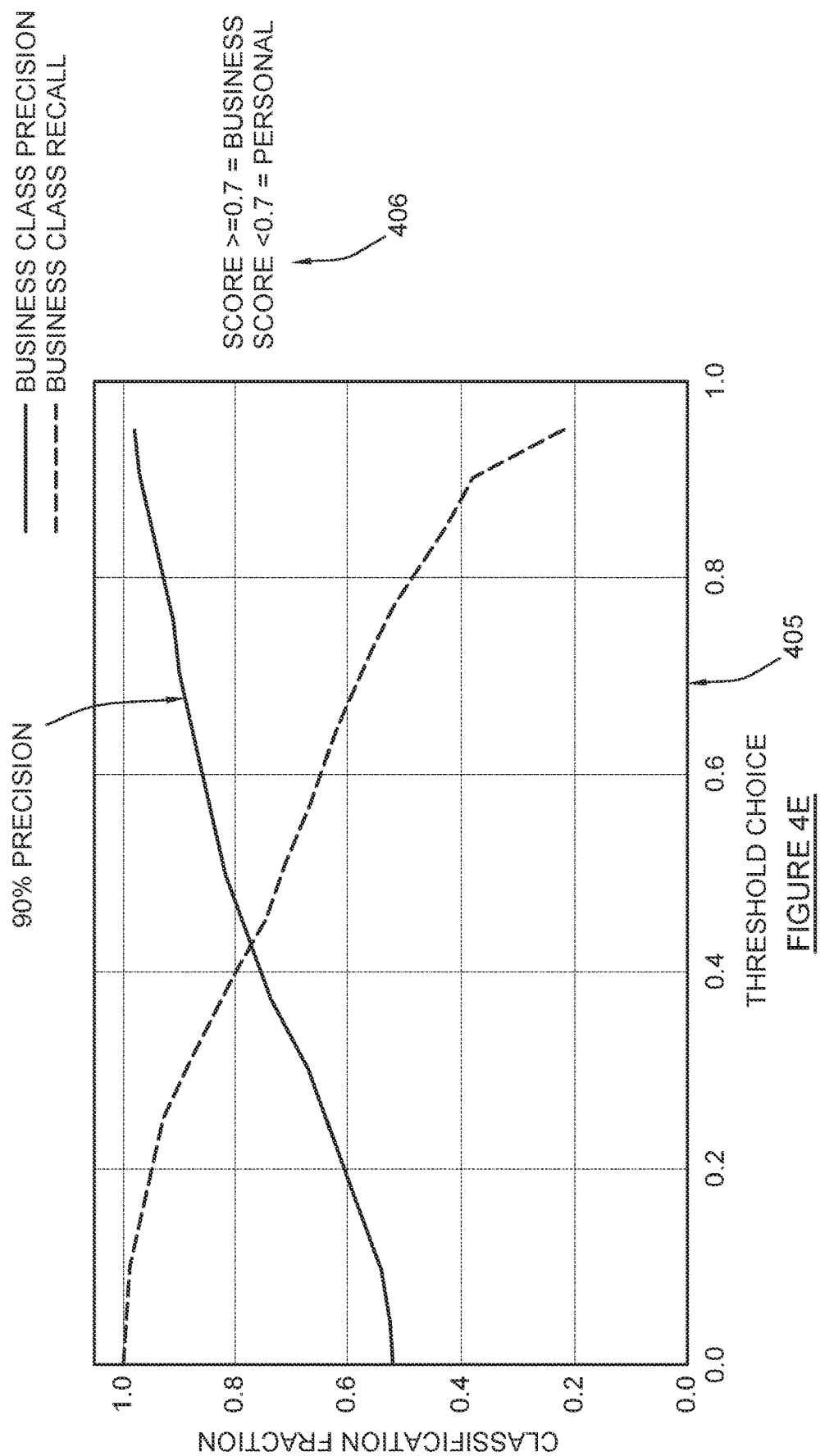

As depicted in FIGS. 4C and 4D, the software sums the weights of the features and calculates a classification probability 405, in operation 3. The value of the classification probability 405 is 0.637. Then as depicted in FIGS. 4E and 4F, the software uses a precision-recall curve to determine a cutoff (or threshold) for class assignment, in operation 4. In this instance, the cutoff 406 is 0.7 which correlates to 90% precision, e.g., as specified by the user of the software (e.g., as a configuration parameter in a scikit-learn Python library). Since the probability 405 is only 0.637, the software classifies the transaction as personal, rather than business. Here it will be appreciated that a high precision such as 90% is appropriate for a classifier for an online tax service, due to the potential penalties that may result from improper classification. In other instances where such potential penalties are absent, a lower precision may be appropriate. In one or more embodiments, the precision may be empirically determined through user research (e.g., customer surveys, focus groups, etc.).

FIGS. 5A and 5B show the output of a process for determining a classification with respect to income for a transaction from a financial account, in accordance with one or more embodiments of the invention. As shown in FIG. 5A, the weights that is assigned to features such as unigram features 501 and 502 result in a probability 503 that is less than the specified precision cutoff of 0.7. Therefore, the software classifies the transaction as personal. In FIG. 5B, the weights that the software assigns to features such as unigram features 504 and 505 result in a probability 506 that is greater than the specified precision cutoff of 0.7. Therefore, the software classifies the transaction as business.

Figure 6A:
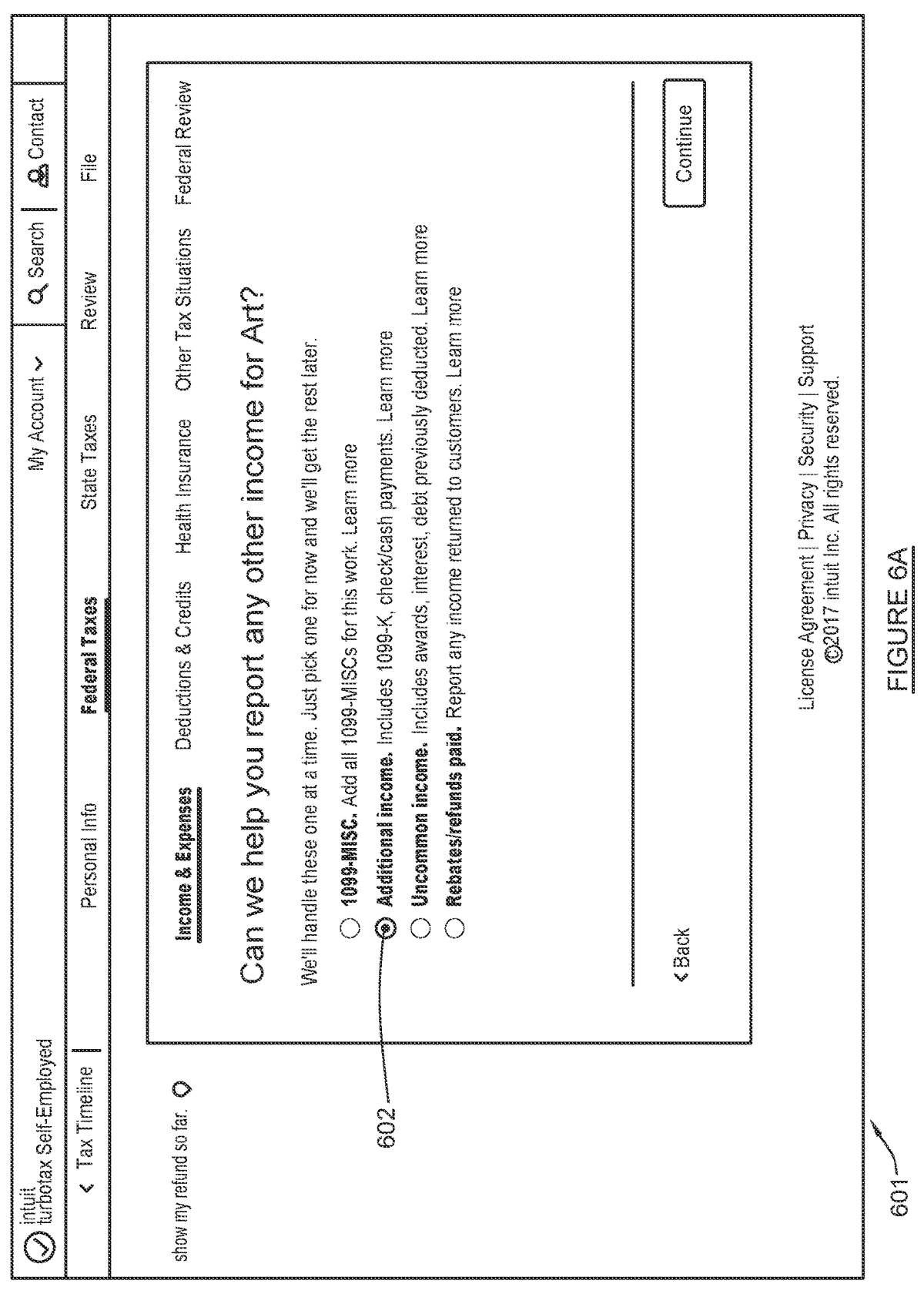
Figure 6C:

FIGS. 6A, 6B, and 6C show GUI views for a multi-user online tax service, in accordance with one or more embodiments of the invention. In one or more embodiments, view 601 in FIG. 6A allows a user to add transactions for non-wage income from the user's financial stream, e.g., by clicking on the radio-button control 602. View 603 in FIG. 6B shows that following a click on the radio-button control 602, the software has classified a 1099 transaction 604 associated with eBay as non-wage income. View 603 includes a button control 605 that allows the user to add expenses. Here it will be appreciated that the processes described here with respect to income (or gross income) may be used in conjunction with similar processes with respect to expenses (or deductions) to compute net income. Following a click on button control 605, View 606 in FIG. 6C shows a multi-button control 607 which allows the user to select a financial stream for his/her expense transactions.

The following use case is for explanatory purposes only and not intended to limit the scope of the invention.

In a first use case, a user of an online tax service has a checking account with a commercial bank. Through an OFX interface, the user can stream the transactions in the checking account into the online tax service. The online tax service uses the software described above to classify the positive flows into the checking account as either wage income, non-wage income, or a non-income transfer, subject to the user's approval as obtained through various views in a GUI. The user accepts most of the online tax services' classifications but reclassifies a few of the transactions (e.g., PayPal transaction, a Square Cash transaction, and a Venmo transaction) that were classified as non-wage income to non-income transfers because the transactions were reimbursements from friends. These reclassifications are used to update the software, in real time. Then the corrected classifications are used to fill in a draft tax return for the user.

In a second use case, a user of an online tax service has a checking account with a commercial bank. Through an OFX interface (e.g., Intuit's Financial Data Service or FDS which performs credential management and establishes an OFX connection), the user can stream the transactions in the checking account into the online tax service. The online tax service uses the software described above to classify the positive flows into the checking account as either wage income, non-wage income, or a non-income transfer, subject to the user's approval as obtained through various views in a GUI. The software further classifies the non-wage income as coming from either eBay, Etsy, or Uber. The user accepts most of the online tax services' classifications but reclassifies a transaction that was classified as non-wage income from eBay to a non-income transfer, since the transaction was a refund. The reclassification is used to update the software, in real time. Then the corrected classification is used to fill in a draft tax return for the user.

Figure 7A:
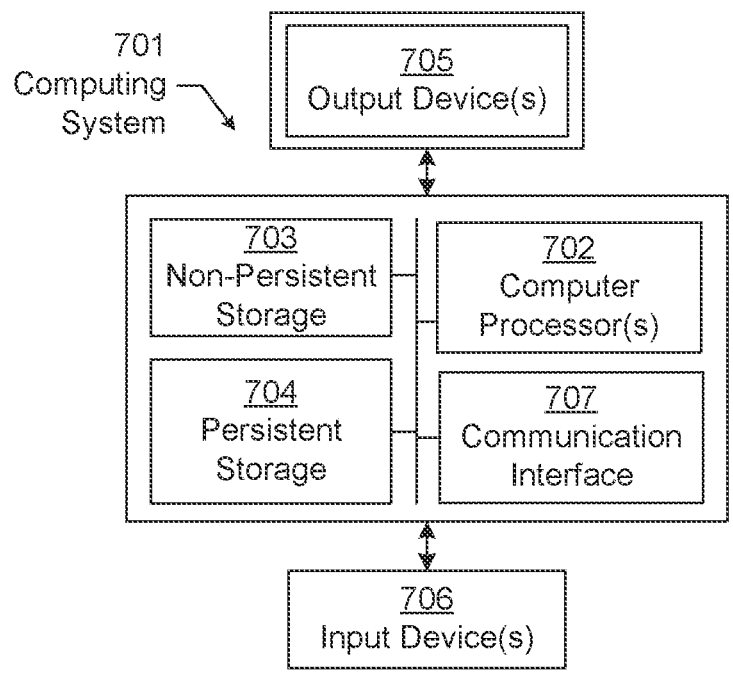
FIGS. 7A and 7B depict diagrams showing a computing system, in accordance with one or more embodiments.

Embodiments of the invention may be implemented on a computing system. Any combination of mobile, desktop, server, embedded, or other types of hardware may be used. For example, as shown in FIG. 7A, the computing system 701 may include one or more computer processor(s) 702, associated memory 703 (e.g., random access memory (RAM), cache memory, flash memory, etc.), one or more storage device(s) 704 (e.g., a hard disk, an optical drive such as a compact disk (CD) drive or digital versatile disk (DVD) drive, a flash memory stick, etc.), and numerous other elements and functionalities. The computer processor(s) 702 may be an integrated circuit for processing instructions. For example, the computer processor(s) may be one or more cores, or micro-cores of a processor. The computing system 701 may also include one or more input device(s) 706, such as a touchscreen, keyboard, mouse, microphone, touchpad, electronic pen, or any other type of input device. Further, the computing system 701 may include one or more output device(s) 705, such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system 701 may be connected to a network 720 (e.g., a local area network (LAN), a wide area network (WAN) such as the Internet, mobile network, or any other type of network) via a network interface connection (not shown). The input and output device(s) may be locally or remotely (e.g., via the network 720) connected to the computer processor(s) 702, memory 703, and storage device(s) 704. Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system 701 may be located at a remote location and connected to the other elements over a network 720. Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Figure 7B:
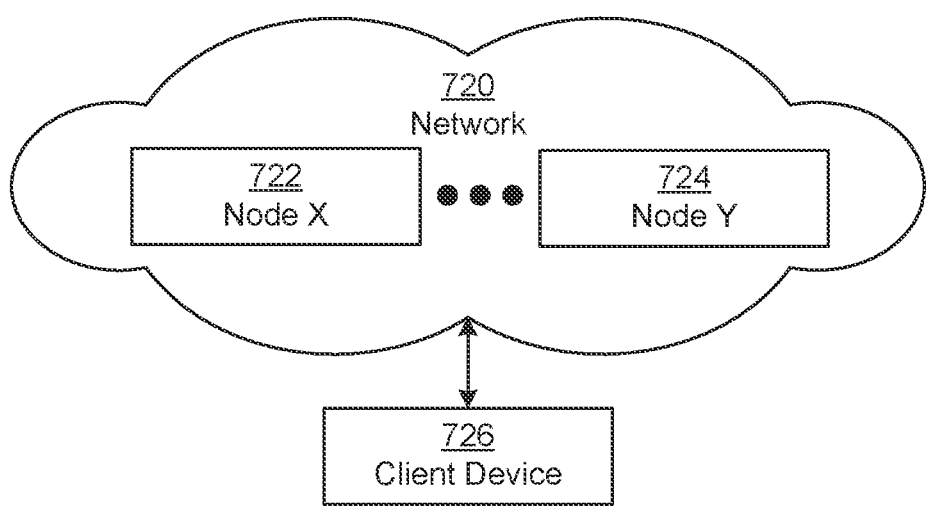

As noted above, the computing system 701 in FIG. 7A may be connected to or be a part of a network. For example, as shown in FIG. 7B, the network 720 may include multiple nodes (e.g., node X 722, node Y 724). Each node may correspond to a computing system, such as the computing system shown in FIG. 7A, or a group of nodes combined may correspond to the computing system shown in FIG. 7A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system 701 may be located at a remote location and connected to the other elements over a network.

Although not shown in FIG. 7B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X 722, node Y 724) in the network 720 may be configured to provide services for a client device 726. For example, the nodes may be part of a cloud computing system. The nodes may include functionality to receive requests from the client device 726 and transmit responses to the client device 726. The client device 726 may be a computing system, such as the computing system 701 shown in FIG. 7A. Further, the client device 726 may include and/or perform all or a portion of one or more embodiments of the invention.

The computing system or group of computing systems described in FIGS. 7A and 7B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 7A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 7A and the nodes and/or client device in FIG. 7B.

Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
obtaining data related to a new transaction from a data stream for an account of an online service;
splitting the data related to the new transaction into a set of unigrams;
generating a new vector of features from the data related to the new transaction, the new vector including a set of values that correspond and are assigned to the set of unigrams;
determining a classification with respect to income for the new transaction by applying a multinomial classifier to the new vector, wherein the multinomial classifier is trained using a vector of features from data related to a historical transaction and a label associated with the historical transaction, to generate a probability that the historical transaction belongs to a specific classification with respect to income, and wherein weights are assigned to a sparse matrix made up of a plurality of vectors that include the vector to train the multinomial classifier;
labeling the new transaction with the classification; and
populating, using the classification, one or more fields of a form that is maintained by the online service.

2. The method of claim 1, further comprising:
presenting the classification to a view of a graphical user interface.

3. The method of claim 1, further comprising:
receiving a reclassification of the new transaction;
populating, using the reclassification instead of the classification, the one or more fields of the form that is maintained by the online service; and
updating, using the reclassification, the multinomial classifier.

4. The method of claim 1,
wherein at least one of the features has been filtered using a custom stop-word dictionary developed through empirical testing of the multinomial classifier, and
wherein the classification is based on a new probability generated by applying the multinomial classifier to the new vector.

5. The method of claim 1, wherein one of the features identifies a weekday on which the historical transaction occurred.

6. The method of claim 1, further comprising:
applying a threshold based on a precision-recall curve to a new probability when determining the classification with respect to income for the new transaction.

7. The method of claim 1, further comprising:
obtaining data related to tax filing for a plurality of accounts of the online service;
clustering the data related to tax filing and the historical transaction to identify potential sources of income; and
training the multinomial classifier to generate the probability that the historical transaction is one of the potential sources of income from clustering the data.

8. The method of claim 1, further comprising the operation of:

retraining the multinomial classifier at an end of a predetermined period using transactions which occurred during the predetermined period.

9. The method of claim 1, wherein the online service is a massively multi-user online service.

10. The method of claim 1, further comprising:
obtaining data related to a plurality of historical transactions,
wherein each historical transaction is associated with a second account provided by the online service and with a label based on a click stream of graphical user interface interactions, and
wherein the label identifies the historical transaction as belonging to a specific classification with respect to income.

11. A system comprising:
a processor;
a storage storing instructions which, when executed by the processor, are configured for:
obtaining data related to a new transaction from a data stream for an account of an online service;
splitting the data related to the new transaction into a set of unigrams;
generating a new vector of features from the data related to the new transaction, the new vector including a set of values that correspond and are assigned to the set of unigrams;
determining a classification with respect to income for the new transaction by applying a multinomial classifier to the new vector, wherein the multinomial classifier is trained using a vector of features from data related to a historical transaction and a label associated with the historical transaction, to generate a probability that the historical transaction belongs to a specific classification with respect to income, and wherein weights are assigned to a sparse matrix made up of a plurality of vectors that include the vector to train the multinomial classifier;
labeling the new transaction with the classification; and
populating, using the classification, one or more fields of a form that is maintained by the online service.

12. The system of claim 11, wherein the instructions are further configured for:
presenting the classification to a view of a graphical user interface.

13. The system of claim 11, wherein the instructions are further configured for:
receiving a reclassification of the new transaction;
populating, using the reclassification instead of the classification, the one or more fields of the form that is maintained by the online service; and
updating, using the reclassification, the multinomial classifier.

14. The system of claim 11, wherein the instructions are further configured for:
wherein at least one of the features has been filtered using a custom stop-word dictionary developed through empirical testing of the multinomial classifier, and
wherein the classification is based on a new probability generated by applying the multinomial classifier to the new vector.

15. The system of claim 11, wherein one of the features identifies a weekday on which the historical transaction occurred.

16. The system of claim 11, wherein the instructions are further configured for:

applying a threshold based on a precision-recall curve to a new probability when determining the classification with respect to income for the new transaction.

17. The system of claim 11, wherein the instructions are further configured for:
obtaining data related to tax filing for a plurality of accounts of the online service;
clustering the data related to tax filing and the historical transaction to identify potential sources of income; and
training the multinomial classifier to generate the probability that the historical transaction is one of the potential sources of income from clustering the data.

18. A method, comprising:
generating a vector of features from data related to a historical transaction;
generating a probability that the historical transaction belongs to a specific classification with respect to income;
obtaining data related to a new transaction from a data stream for an account of an online service;
splitting the data related to the new transaction into a set of unigrams;
generating a new vector of features from the data related to the new transaction, the new vector including a set of values that correspond and are assigned to the set of unigrams;
determining a classification with respect to income for the new transaction by applying a multinomial classifier to the new vector, wherein the multinomial classifier is trained using the vector of features and the probability, and wherein weights are assigned to a sparse matrix made up of a plurality of vectors that include the vector to train the multinomial classifier;
labeling the new transaction with the classification; and
populating, using the classification, one or more fields of a form that is maintained by the online service.

* * * * *